(12) United States Patent
Barber et al.

(10) Patent No.: US 7,382,756 B2
(45) Date of Patent: Jun. 3, 2008

(54) INTEGRATED USER AND RADIO MANAGEMENT IN A WIRELESS NETWORK ENVIRONMENT

(75) Inventors: Simon Barber, San Francisco, CA (US); Roy Petruschka, Kiryat Tivon (IL); Edward Rodriguez de Castro, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 580 days.

(21) Appl. No.: 10/430,682

(22) Filed: May 5, 2003

(65) Prior Publication Data

US 2004/0076134 A1    Apr. 22, 2004

Related U.S. Application Data

(60) Provisional application No. 60/380,153, filed on May 4, 2002.

(51) Int. Cl.
*H04Q 7/24*    (2006.01)
(52) U.S. Cl. ....................... 370/338; 370/329; 370/410; 455/410; 709/227
(58) Field of Classification Search ................ 370/338, 370/329, 401; 709/227, 228; 455/410
See application file for complete search history.

(56) References Cited

U.S. PATENT DOCUMENTS

| | | | |
|---|---|---|---|
| 5,621,732 A | 4/1997 | Osawa | |
| 5,663,954 A | 9/1997 | Hakkanen | |
| 6,141,763 A | 10/2000 | Smith et al. | |
| 6,359,872 B1 | 3/2002 | Mahany | |
| 6,714,987 B1 * | 3/2004 | Amin et al. | ................ 709/249 |
| 6,910,074 B1 * | 6/2005 | Amin et al. | ................ 709/227 |
| 7,016,948 B1 | 3/2006 | Yildiz | |
| 7,039,027 B2 * | 5/2006 | Bridgelall | ................ 370/329 |
| 7,046,690 B2 | 5/2006 | Sherman | |
| 7,072,652 B2 | 7/2006 | Stephens | |
| 7,130,625 B2 | 10/2006 | Akgun | |
| 7,130,904 B2 | 10/2006 | Kitchin | |
| 7,133,909 B2 | 11/2006 | Bahl | |
| 7,146,636 B2 | 12/2006 | Crosbie | |
| 7,149,197 B2 | 12/2006 | Garahi | |
| 2002/0035699 A1 | 3/2002 | Crosbie | |
| 2002/0136233 A1 * | 9/2002 | Chen et al. | ................ 370/445 |
| 2002/0150095 A1 | 10/2002 | Sherman | |
| 2002/0178365 A1 | 11/2002 | Yamaguchi | |
| 2003/0093691 A1 | 5/2003 | Simon et al. | |
| 2003/0196115 A1 | 10/2003 | Karp | |
| 2004/0013128 A1 | 1/2004 | Moreton et al. | |
| 2004/0120301 A1 | 6/2004 | Moreton et al. | |
| 2004/0160928 A1 | 8/2004 | Kitchin | |
| 2004/0196822 A1 | 10/2004 | Proctor, Jr. | |
| 2005/0025129 A1 | 2/2005 | Meier | |
| 2006/0120336 A1 | 6/2006 | Frantaske | |

\* cited by examiner

*Primary Examiner*—Danh Le

(57) ABSTRACT

A system and method in which user management and radio management functionalities associated with a wireless network, such as an IEEE 802.11 wireless network, are integrated to provide wireless network services thereof. In general, according to the present invention disclosed herein, a link layer authentication module for linking a plurality of wireless network layers to one another is integrated with a network management module, such that the network management module and the link layer authentication module together form an integrated user and radio management module which provides wireless network services for the wireless network. The use of link layer authentication under the IEEE 802.1x standard can be integrated with network management functionality thereof in order to associate both and provide a variety of useful wireless network services.

9 Claims, 14 Drawing Sheets

ACTIVE CLIENTS TABLE 220

| CLIENT SSID | NETWORK # | UNICAST KEY(S) | ROUTING INFO | · · · |
|---|---|---|---|---|
| | | K1A, K1B, K1C, K1D | | |
| | | | | |
| | | | | |
| ⋮ | | | | |

FIG. 4(A)

RADIO STATS TABLE 222

| # | STA? | RADIO SSID | AP? | ASSOCIATED? | LAST XMIT TIME | CHANNEL | SIGNAL QUALITY | SIGNAL STRENGTH | THROUGHPUT | ... |
|---|------|------------|-----|-------------|----------------|---------|----------------|-----------------|------------|-----|
| 1 | N    | N/A        | N/A | N/A         |                |         |                |                 | N/A        |     |
| 2 | Y    | 00-FB...   | N   | Y           |                |         |                |                 |            |     |
| 3 |      |            |     |             |                |         |                |                 |            |     |
| ... |    |            |     |             |                |         |                |                 |            |     |

FIG. 4(B)

BROADCAST KEYS TABLE 224

| NETWORK # | BROADCAST KEY(S) |
|-----------|------------------|
| 1         | BK1A, BK1B, ...  |
| 2         | BK2A, BK2B, ...  |
| ...       |                  |

FIG. 4(C)

| USER MAC ADDRESS | ACTUAL PHYSICAL LOCATION | EXPECTED PHYSICAL LOCATION | ACTIVE SERVICE | ... |
|---|---|---|---|---|
| | | | | |

FIG. 9(A)

| USER MAC ADDRESS | HISTORICAL CONNECTION DATA | TROUBLE TICKETS | | ... |
|---|---|---|---|---|
| | | | | |

FIG. 9(B)

INTEGRATED USER AND RADIO MANAGEMENT IN A WIRELESS NETWORK ENVIRONMENT

CROSS-REFERENCE TO RELATED APPLICATIONS

The present application claims the benefit of priority under 35 USC §119 from U.S. Provisional Patent Application No. 60/380,153 filed on May 4, 2002, the disclosure of which is hereby incorporated by reference in its entirety for all purposes.

TECHNICAL FIELD

The present invention is generally related to wireless networks and more particularly to systems and methods for providing greater control over wireless networks than previously available.

BACKGROUND OF THE INVENTION

Wireless local area networks (WLAN) can be used in a variety of commercial, industrial and consumer applications, thereby permitting mobile and portable user computers and devices to efficiently transmit and receive data between a user computer or device and a remote system without requiring a wired connection therebetween. Many mobile and portable users, particularly in businesses, factories, universities and other professions can benefit tremendously both in terms of efficiency and productivity with the enhanced capabilities of a WLAN.

A number of systems for implementing WLANs have been proposed and implemented. One class of systems is those conforming to, and/or interoperable with, one or more IEEE 802.11 standard. The IEEE 802.11 is a popular and well-known standard and comprises several extensions to date, with additional extensions likely. The extensions include 802.11a, 802.11b, etc. and it should be understood herein that general references to the 802.11 standard encompass the currently adopted extensions and extensions that follow.

Wireless signals conforming to the IEEE 802.11 standard propagate in a 2.4-2.5 GHz ISM (industrial, scientific and medical) band, a 5 GHz band, infrared bands and others. The ISM band in particular is currently available worldwide and generally permits unlicensed operation for spread spectrum systems. For the US and Europe, the 2,400-2,483.5 MHz band has been allocated, while for some other countries, such as Japan, another part of the 2.4-2.5 GHz ISM band has been assigned.

Networks, protocols and standards are typically designed and specified according to a now standard seven-layer ISO/OSI network model. Within that model, the 802.11 standard generally focuses on the MAC (medium access control) layer and the PHY (physical) layer.

802.11-compliant communication occurs between stations. Some stations serve as access points between a wireless medium and a distribution system other than the wireless medium, while other stations only use the wireless medium to communicate 802.11 data. An example of a distribution system is a wired local area network (LAN), such as an Ethernet-protocol LAN, the Internet, or other network. The distribution system might even be another wireless system (which might be useful to support a number of nodes that can access the access point wirelessly, but not the wireless medium that is used as that access point's distribution system). The same wireless network might also serve as the distribution system (DS) using "wireless DS" transport.

While an access point is a station according to the 802.11 standard if it interacts with the wireless medium, the term "station" is often informally used to refer to a network node that is not connected to a distribution system and the term "access point" is used to refer to a station/node that is connected to a distribution system, thus allowing a distinction between nodes that can access a distribution system outside the wireless medium and those that cannot. That convention is used hereinafter, unless otherwise indicated.

Wireless networks with multiple stations but no access points are referred to as "ad-hoc" networks. Without more, an ad-hoc network allows for communication among stations accessible via a wireless medium, but not for communications beyond that ad-hoc network.

In an 802.11 wireless network with at least one access point, a station located within a group or cell sends packets of data to the access point, which in turn forwards messages/packets/data to a destination such as a station within the same cell or, via the access point's distribution system, to a destination outside the wireless medium.

The 802.11 standard generally supports several data signalling schemes: DSSS (direct sequence spread spectrum) with differential encoded BPSK and QPSK; FHSS (frequency hopping spread spectrum) with GFSK (Gaussian FSK); OFDM (orthogonal frequency division multiplexing, infrared with PPM (pulse position modulation) are several examples. DSSS, FHSS and infrared all provide bit rates of 1 Mbs (megabits per second) and 2 Mbs. The 802.11b extension provides for a high rate CCK (Complementary Code Keying) physical layer protocol, providing bit rates of 5.5 and 11 Mbs as well as the basic DSSS bit rates of 1 and 2 Mbs within the 2.4-2.5 GHz ISM band. The 802.11a extension provides for a high bit rate OFDM (Orthogonal Frequency Division Multiplexing) physical layer protocol providing bit rates in the range of 6 to 54 Mbs in the 5 GHz band. The 802.11g extension provides for 802.11a-like signalling, but in the 2.4-2.5 GHz band.

The 802.11 basic medium access control (MAC) behavior allows interoperability between compatible physical layer protocols through the use of the CSMA/CA (carrier sense multiple access with a collision avoidance) protocol and a random back-off time following a busy medium condition. In addition, directed traffic can use an immediate positive acknowledgement (ACK frame) protocol, wherein a retransmission is scheduled by the sender if no positive acknowledgement is received. The 802.11 CSMA/CA protocol is designed to reduce the collision probability between multiple stations accessing the medium at the point in time where collisions are most likely occur. The highest probability of a collision occurs just after the medium becomes free, following a busy medium. This is because multiple stations would have been waiting for the medium to become available again. Therefore, a random back-off arrangement is used to resolve medium contention conflicts. In addition, the 802.11 MAC defines special functional behavior for fragmentation of packets, medium reservation via RTS/CTS (request-to-send/clear-to-send) polling interaction, and point coordination (for time-bounded services).

The IEEE 802.11 MAC also defines beacon frames, sent at a regular interval by an AP to allow STAs to monitor the presence of the AP. IEEE 802.11 also defines a set of management frames including probe request frames that are sent by a station and are followed by probe response frames sent by the AP. Probe request frames allow a station to actively scan whether there is an AP operating on a certain channel frequency, and for the AP to show to the station what parameter settings the AP is using.

A client uses the wireless network by finding an AP, authenticating to that AP and associating with that AP. Normally, a client associates with one AP at a time, but where connection to one AP is lost, the client can associate with another AP (or reassociate with the same one after a connection is lost or closed). The AP's of a network can communicate over a distribution system (DS). One reason for communicating between AP's is where an AP has frames buffered for a client, but loses the client. That AP might discover that the client is now associated with a different AP and will forward the buffered frames to that new AP via the DS. The access points might also connect to a network outside of the 802.11 wireless network. In some cases, the DS is not distinct from that outside network. That outside network could be another wireless network, but a common configuration has the outside network being a local area network (LAN).

When a wireless LAN station is powered on, it first looks for an access point. After it finds an access point, the wireless LAN station registers itself with the access point (authentication, association). The station can then synchronize with the access point and, thereafter, transmit and receive data frames to and from the access point. In a common example, the client station is a portable or mobile computer with a wireless networking card installed therein. 802.11 management frames are used to set up these connections.

Unlike wired networks, where a network is secured at boundaries by which wires connect to the network, wireless networks do not have well-defined boundaries. A company on one floor of a building might have a wireless network that can be reached by a computer on a different floor using a computer unrelated to the company that set up the wireless network. Consequently, it is easier to join into a wireless network, for authorized users as well as unauthorized users.

In some cases, a wireless network could be coupled to a wired network without oversight by the operators of the wired network. For example, many access points have a standard interface and can be easily plugged into a standard wired network connector, thus opening up a previously secured wired network to wireless traffic. Where an uninformed end-user replaces a wired network connection with an access point and does not secure the access point, the wired network would then be open to users within radio range of the access point, even if they were not within the physical space controlled by the organization for which the wired network is being maintained.

Some network operators have attempted to address unexpected access points by physically surveying their network. In one approach, a network administrator would walk with a network sniffer through all of the space controlled by the organization, but for large spaces, this is often impractical.

In large wireless networks, considerable effort is needed to maintain numerous access points and when a large number of access points are needed, for bandwidth reasons, coverage reasons, etc., the cost can be considerable as the full functionality of an access point needs to be repeated in the space where the network is set up.

Another difficulty of wireless networks is that of not necessarily authorized users in the authorized space. For example, if a visitor with a wireless computer or wireless device is in a company building that is covered by the company's wireless network, that visitor might connect to the company network and have access equivalent to that of an employee, and that is generally undesirable.

Yet another difficulty of wireless networks is network overlap. Where a space is to have multiple wired networks, parallel sets of network cabling can be laid down. This can be effected with wireless networks by overlapping access points and programming the access points to be selective with associations, but this necessarily involves more hardware than is necessary to support the space.

In light of the above, the inventors have invented improvements to wireless networks.

BRIEF SUMMARY OF THE INVENTION

In embodiments of a wireless network according to the present invention, access points are used for monitoring radio spectrum traffic and interference thereof in a wireless network, managing control functions (access control, user management, radio management, tunnelling, etc.) A command and control center (CCC) is generally associated with the wireless network, wherein the CCC manages and controls the access points associated with the wireless network. Control frames (MMPDUs, in the case of 802.11 networks) received by the access point can be automatically transferred to the CCC, which thereafter transfers a response back to the access point, thereby granting or denying access to the wireless network to users thereof based on the response transferred from the CCC. The CCC might have a user interface, or could be largely automated.

The CCC manages radio monitoring to generate a radio mapping of the wireless network and the radio environment thereof based on data received from the access points. A firewall is generally located between the CCC and a visitor gateway. The visitor gateway can communicate with a remote computer network (e.g., the Internet) and restrict access to the wireless network by a visiting user through or from the remote computer network. The CCC also can automatically route the visiting user to the visitor gateway when the visiting user attempts to access an access point associated with the wireless network.

A plurality of clients can be generally associated with the wireless network such that the clients are separated into one or more client groups (defining a subnetwork of the network). Each client group possesses a shared key for accessing a predetermined telecommunications network through at least one interface partitioned from the access point and using broadcast frames and encryption, the CCC can arrange the network such that clients ignore broadcast packets for other than its subnetwork.

A further understanding of the nature and the advantages of the inventions disclosed herein may be realized by reference to the remaining portions of the specification and the attached drawings.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 4 illustrates several data tables maintained by an access point according to aspects of the present invention.

FIG. 9 illustrates several data tables that might be maintained by a CCC to improve network connections and user experiences.

DETAILED DESCRIPTION OF THE INVENTION

Figure 1:
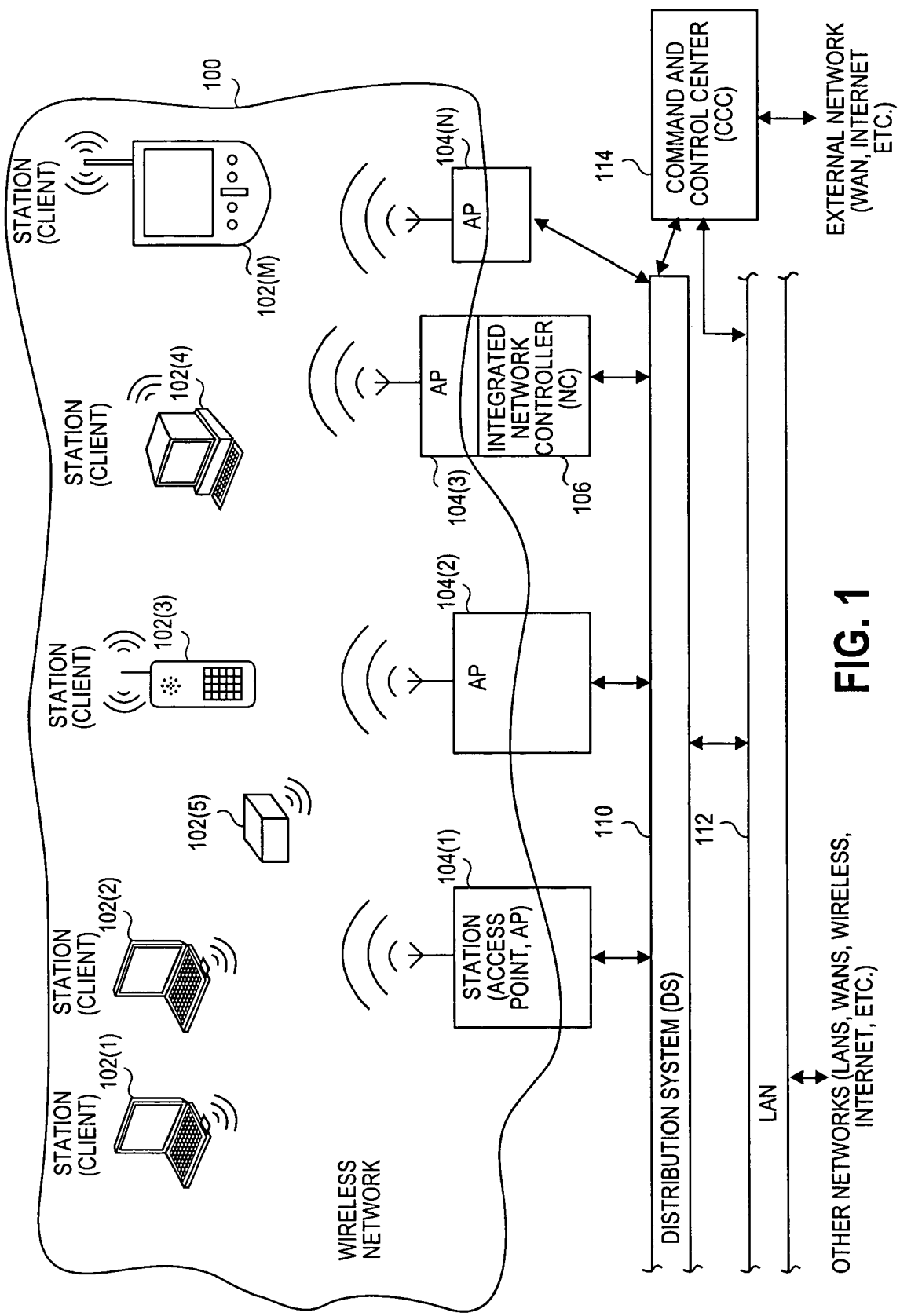
FIG. 1 is a block diagram of a wireless network and components to support the network according to the present invention.

The particular values and configurations discussed in these non-limiting examples can be varied and are cited merely to illustrate an embodiment of the present invention and are not intended to limit the scope of the invention.

Definitions

Networking technologies are often described with respect to the seven-layer network model referred to as the ISO open system interconnect (OSI) network model. Another similar model is the four-layer model used for Internet communications. The lowest layer of the ISO/OSI network model is the physical (PHY) layer and the next layer up is the data-link layer, which is generally divided into a lower layer and an upper layer, referred to as the Medium-Access Control (MAC) layer and Logical Link Control (LLC), respectively. While the present invention is not limited to any particular network model, the examples used herein generally fall within the MAC layer.

The MAC layer provides access control functions such as addressing, access coordination, frame check sequence generation and checking for shared-medium PHYs in support of higher layers. The IEEE 802.11 specification is a wireless local area network (WLAN) standard that defines a set of specifications for physical layers (PHYs) and a medium access control (MAC) layer. With some exceptions, the unit of communication at the MAC layer is the "frame", comprising a plurality of bits transmitted through the physical layer. As used herein, the term "frame" may refer to a group of data bits in a specific format, such as those defined by the 802.11 standard, including data frames and management frames.

The 802.11 standards provide well-known approaches to wireless networking and will not be described in detail here. However, the 802.11-1999 standard, the 802.11a-1999 supplement to 802.11, the 802.11b-1999 supplement to 802.11 and the 802.11g draft 3.0 supplement to 802.11 are incorporated by reference herein for all purposes. The 802.11 standards generally address requirements of the PHY and MAC layers.

Typically, but not always, the same protocols and standards are used at the LLC layer and above for 802.11 networks and other networks conforming to the 802 LAN standards, such as 802.2. One such standardization is that 48-bit addresses are used. In 802 LAN standards, these are typically referred to as "MAC addresses". In 802.11 standards, these might be referred to as service set identifiers ("SSID"), BSSID, ESSID, etc. Typically, each device that operates on an 802.11 network or other 802 network that is a stored within it a MAC address assigned by its manufacturer in a manner that ensures that the stored MAC address is unique over all manufactured devices. Network devices typically use MAC addresses to create and update routing tables and network data structures and to determine whether a particular frame is directed at that device or where to direct a particular frame. The term "MAC address" can be utilized interchangeably with the term "link layer address".

While it might be common to the point of being a convention that addresses on a wireless network and communication systems outside of the wireless network that are connected to the wireless network are addresses that are compatible and unique across the entire system, the present invention is not necessarily limited to such addressing schemes although many of the examples herein assume a unified, coordinated address space. Such unification has its advantages, allowing for simple bridging from wireless to IEEE 802 wired networks.

Generally, data being communicated herein is assumed to be in the form of digital transmissions. However, it should be understood that such data can take a number of forms, such as bits, values, elements, symbols, characters, terms, numbers or the like, and can be represented as electrical or magnetic signals, states of storage elements, or the like. It is also assumed that physical signals can either be represented as analog electrical or magnetic signals, stored state, digital samples represented by numbers of predefined precision, a time sequence of such digital samples, or the like.

The present invention should not be construed as being limited to any particular data form or representation, although it is generally understood that the data physically exists and is capable of being stored, transferred, combined, compared, and otherwise manipulated by physical processes. Further, manipulations performed are often referred to in terms that are commonly associated with mental operations performed by a human operator, even though the manipulations can only be practically performed as machine operations. Useful machines for performing operations of the present invention include data-processing systems, such as general-purpose digital computers, server-based devices, handheld devices, embedded devices, wireless and/or wireline networks, or other similar devices and systems thereof. In all cases, the distinction between the method of operations in operating a computer and the method of computation itself should be borne in mind.

Throughout this specification, aspects of the disclosure are described by block diagrams, swim diagrams and flowcharts. Where an element is shown in a block diagram by a simple box, it should be understood that the element could be made and used with the reference to the entire specification and knowledge available to one of ordinary skill in the art. The swim diagrams illustrate interactions between two or more elements in a particular time order. Unless otherwise indicated, it should be understood that some of the interactions might occur in different orders and the diagrams are nearly illustrations of one particular order. The elements of the swim diagrams and flowcharts are labeled with an apparent order (e.g., S1, S2, S3, etc.) for ease of explanation, but it should be understood that other orders are contemplated by this disclosure.

Throughout the figures, elements shown are labeled with reference numbers. Like elements are referenced with the same reference number, with distinct instances if like objects denoted with a common reference number followed by a parenthetical instance indicator (e.g., (1), (2), etc.). Where the number of like objects is not critical, the like objects are parenthetically numbered ending with a placeholder such as "n". It should be understood that, unless otherwise indicated, the fact that different sets of objects are referenced with the same placeholder, that does not necessarily indicate that there are the same number of objects.

A number of elements might be implemented entirely in software, entirely in hardware of a combination thereof, wherein software comprises a plurality of instructions executable by a processor, computer, or other programmable object, to effect the function of the software. The present invention is not limited to any particular implementation, unless otherwise indicated. In methods described herein, processes described as computing steps might be carried out by processing electrical or other (e.g., mechanical, chemical) physical signals to generate other desired physical signals, and can be implemented via one or more computing device, with the software instructions stored with the computing device or provided to the computing device as needed. In some devices, computing and or data storage performed for the computing device outside of the computing device (such as server operations), but integrated such that the computing device uses the software as needed for its own purposes.

It can be appreciated by those skilled in the art that embodiments of the present invention may be implemented as a program product (i.e., computer program product) composed of one or more modules. The term "module" as used herein generally refers to a software module, a hardware module, or a module using hardware and software components. In the computer programming arts, it is known that a module can be implemented as a collection of routines and data structures that performs particular tasks or implements a particular abstract data type. Modules may include lists of constants, data types, variables, routines, etc. Modules need not be organized with data being distinct from routines, and various object models might be used to create and operate the modules.

It can be additionally appreciated by those skilled in the art the system and/or method described herein can be implemented as a single module or a series of modules. Such modules can be utilized separately or together to form a program product that can be implemented through signal-bearing media, including transmission media and recordable media. A module can be stored, for example, within a memory location of a server and processed via associated processors or microprocessors thereof. Such modules may also control and command functions associated with such a server or devices in communication with the server.

The term "user management" generally refers to activities that involve the identification of a network user, the type of network privileges associated with that network user, and the level of service that the user should be receiving. The term "radio management" generally refers to telecommunications activities taking place within a wireless network. For example, radio management can include a determination of the access point (AP) communicating with a device having a particular MAC address, along with the type and location of the service being provided.

In the examples described herein, the wireless network is an IEEE 802.11 network, but it should be clear that other networks and variations of IEEE 802.11 networks could be used instead. Each network device is referred as to a "station". Stations that derive their connectivity solely through the wireless network are referred to herein as "clients" and stations that connect to networks outside of the wireless network and are usable to carry traffic from clients to such networks are referred to herein as "access points". Of course, a client might have other techniques for communication outside the wireless network, but it is assumed that the client does not carry data for other device is in the wireless network. For example, a cellular telephone that is enabled for communication over a wireless network might be described as a client even the now the cellular telephone is able to communicate through a telephone network independent of the wireless network. The term "outside network" is used herein to refer to communications channels other than the wireless network being described where the outside network might be the destination of some of the traffic of the wireless network. Thus, clients that communicate over a wireless network will communicate to an access point that carries the communication over the outside network. The outside network could itself be a wireless network.

The above concepts should be kept in mind in understanding the figures and their description below.

FIG. 1 is a diagram illustrating one embodiment of a wireless network 100 according to aspects of the present invention. FIG. 1 shows several variations, not by way of limitation, clients 102, such as laptops 102(1) and 102(2), cellular telephone 102(3), desktop computer 102(4), embedded device 102(5) and handheld computer 102(M). Typically, but not required, each client is a portable or mobile computer or computing device. Clients 102 can communicate using various wireless methods, such as the infrared or radio-frequency methods defined by the 802.11 standard. Not all clients need to have user interfaces, as illustrated by embedded device 102(5).

Clients 102 communicate to outside networks via access points 104. One such access point, 104(3), includes an integrated network controller (NC) 106, described in more detail below. Access points 104, interact with the wireless space and a distribution system (DS) 110. Distribution system 110 is typically a wired system, but that need not be the case. Distribution system 110 is in turn coupled to a local area network (LAN) 112, although other types of connections could be used. In some implementations, distribution system 110 is not necessarily distinct from LAN 112.

A Command And Control Center (CCC) 114 is shown coupled to distributional system 110 and LAN 112. If one of the access points 104 includes an integrated network controller 106, it might assume the role of the (CCC) 114, but in many these examples, it is assumed that a (CCC) distinct from the access points, is used.

As shown in FIG. 1, (CCC) 114 might include connections to external networks, such as a wide area network (WAN), the Internet, etc. and LAN 112 might be coupled to other networks, such as other LANs, WANs, the Internet, other wireless networks, etc.

As described herein, the use of the CCC provides many benefits. One benefit is the ability to centrally control wireless network 100, allowing for simpler access points. Such control might include monitoring the radio environment of wireless network 100, controlling access by clients to access points and networks beyond the access points, integrating user management and radio management, and implementing a visitor gateway. A CCC might also be used to coordinate with access points to provide for multiple independent networks from one access point BSSID.

A client communicates beyond the wireless network via an access point. The client associates with one access point (for a given network) and that access point conveys data from the client and also receives data on behalf of the client and transmits that data to the client. For an access point to allow an association, the client needs to authenticate itself to the access point (in some networks, anyone can connect).

Figure 2:
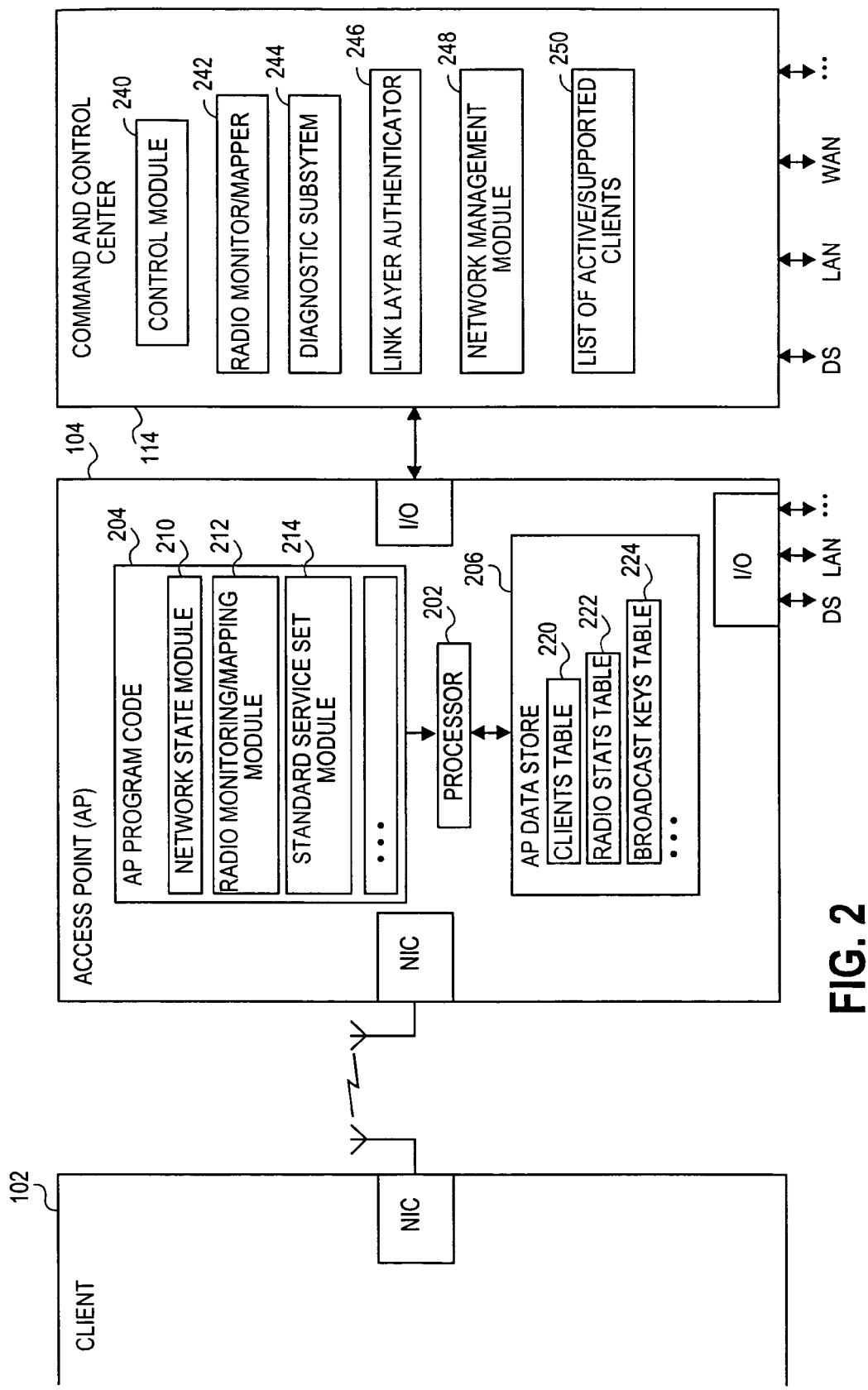
FIG. 2 is a block diagram showing elements of FIG. 1 in greater detail.
Figure 3A:
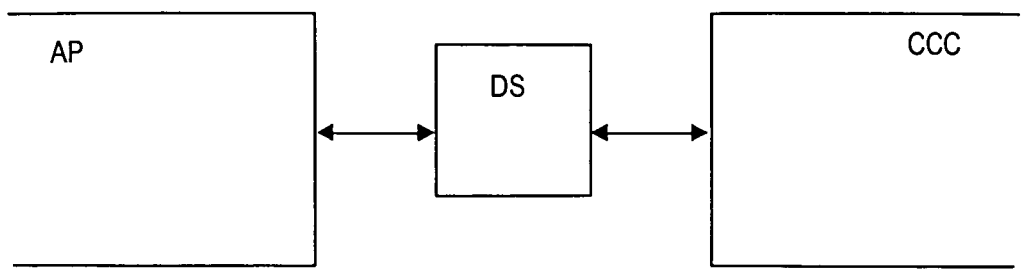
FIG. 3 illustrates several variations of communication paths between an access point and a command and control center (CCC).
Figure 3B:
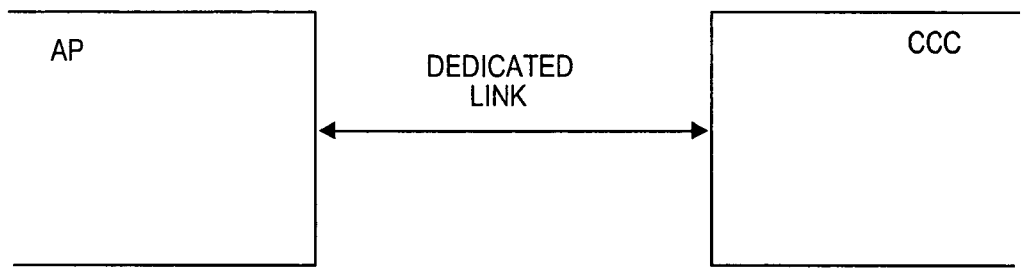
Figure 3C:
Figure 3D:
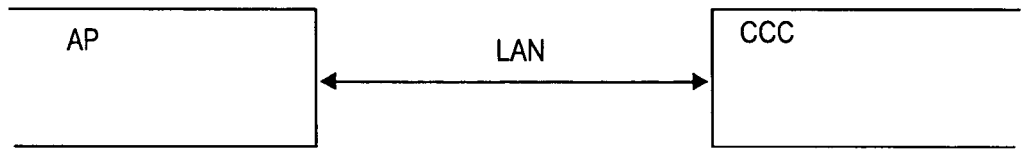
Figure 3E:
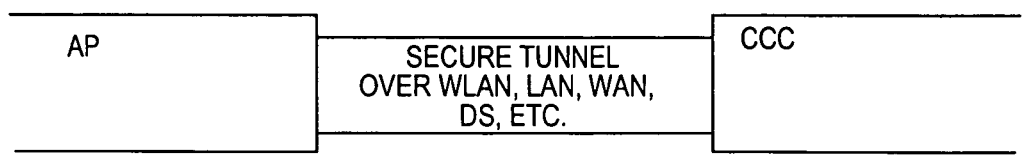

FIG. 2 illustrates one client 102, one access point (AP) 104, and one CCC 114 in greater detail. It should be understood that a typical wireless network would include a plurality of clients and a plurality of access points, and possibly also a plurality of CCCs.

As shown in the figure, AP 104 comprises a processor 202, program code 204, data store 206, a network interface to receive data from and said data to other network devices such as client 102, an interface to communicate with CCC 114, any interfaces as needed for other communications, such as communications with a distribution system (DS) and a local area network (LAN). Other elements, components and modules might be present in AP 104, but are not shown.

Program code 204 is shown including a network state module 210, a radio monitoring/mapping module 212 and a standard service set module 214. Standard service set module 214 can perform the functions typically found in conventional access points, and as such, need not be described in detail here. Other modules might be present, but are not shown. Data store 206 is shown comprising several data objects, such as a clients table 220, a radio stats table 222, a broadcast keys table 224, and other data objects not shown.

CCC 114 is shown in comprising a control module 240, a radio monitor/mapper module 242, a diagnostic subsystem 244, a link layer authenticator 246, a network management module 248, and a list of active/supported clients 250. Other modules and data structures are present in CCC 114 but are not shown. As indicated, CCC 114 can communicate with a distribution system, a LAN (such as a corporate network), a WAN, the Internet, or the like.

CCC 114 can perform a number of functions, such as controlling access to the wireless network, managing radio mapping and otherwise monitoring, controlling, evaluating, reconfiguring, etc. the wireless network for optimal performance, security and user satisfaction. As illustrated in FIGS. 1-2, clients interact with access points and access points interact with the CCC. Access points generally function as the points on the edge of wireless network 100 and CCC controls those access points. In a typical wireless network, there will be more access points than CCCS, so centralizing some functions traditionally performed by access points into the CCC allows for less expensive access points, simpler maintenance and oversight of the network, and a number of other benefits.

FIG. 3 illustrates a number of variations for communication between an access point and a CCC. FIG. 3(A) shows communication via a distribution system (DS). The medium to which an access point connects just outside the wireless network in an 802.11 network is referred to as a distribution system and can have a variety of forms. FIG. 3(B) shows communication over a dedicated link, which might be a direct wire. FIG. 3(C) shows a variation wherein the access point and the CCC are integrated into a single device. FIG. 3(D) shows communication over a LAN. FIG. 3(E) shows communication over a secure tunnel over a wireless LAN, LAN, WAN, DS, etc.

FIG. 4 illustrates a number of tables that might be maintained at an access point in access point data store. FIG. 4(A) illustrates an active clients table; FIG. 4(B) illustrates a radio stats table; and FIG. 4(C) illustrates a broadcast keys table. The utility of these various tables is described herein. As an example, the active clients table holds a list of clients that are associated, or the process of being associated or disassociated, with the access point. As described herein, the function of determining which clients are allowed to associate with the access point is a function of the CCC, thereby allowing more efficient control over access. The radio stats table holds information about radios "visible" to the access point. With a collection of radio stats from a plurality of access points, the CCC can determine a great deal about the nature of the wireless network's space. These advantages are described below in reference to FIGS. 5-8.

Figure 5:
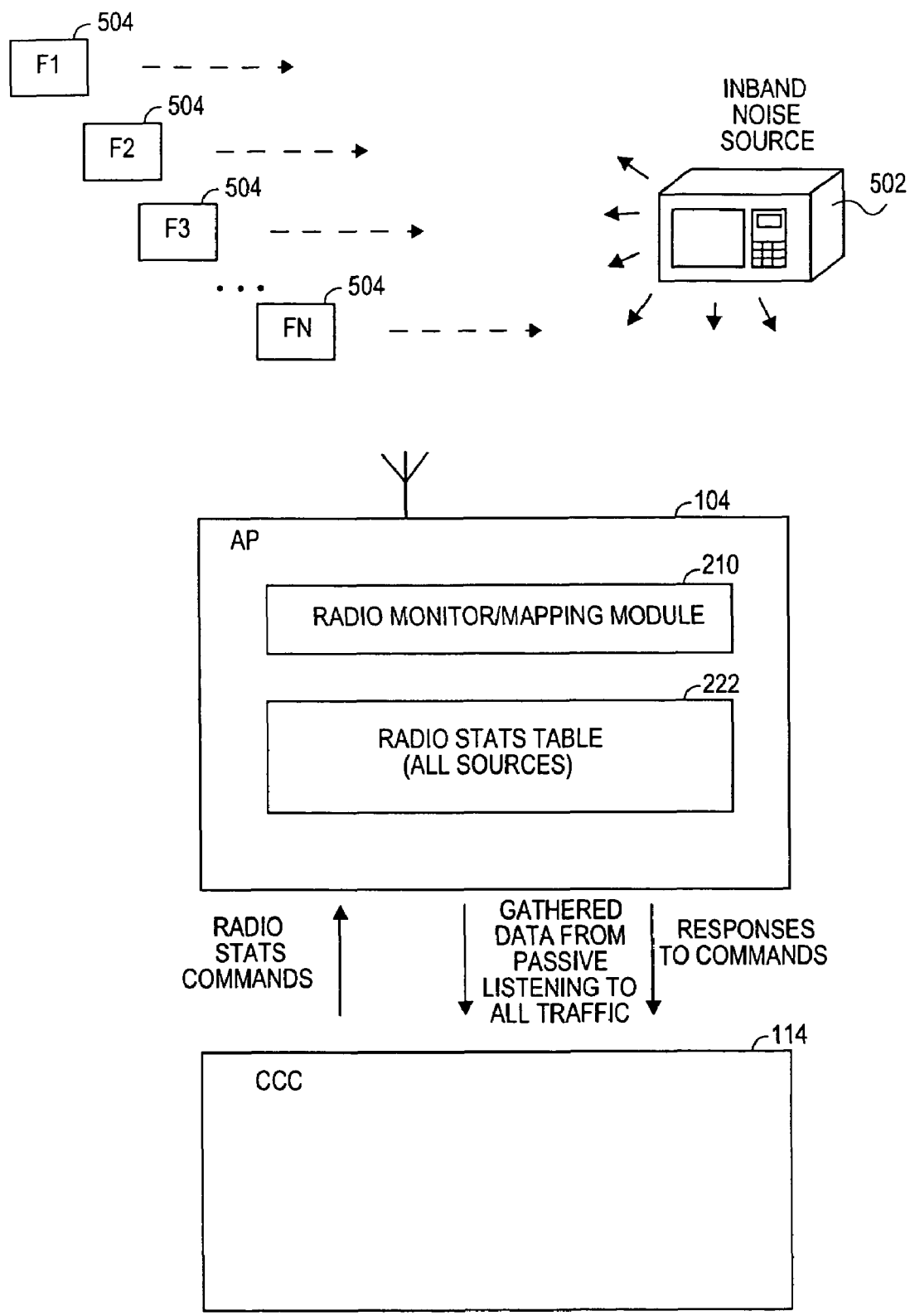
FIG. 5 illustrates an access point monitoring radio traffic under control of the CCC.

FIG. 5 illustrates how an access point might be used to monitor or more map radio devices in the wireless network. As illustrated, access point 104 can listen to passing MAC frames 504 as well as signals from in-band noise sources 502. In this example, noise is source 502 is a microwave oven. One radio band in which 802.11 signals propagate is the radio band around 2.4 to 2.5 GHz. Microwave ovens, cordless telephones, Bluetooth devices, etc., also operate in that radio band and since they are not operating as wireless network devices during their normal operation, signals will be received by the access point that are not valid MAC frames. Normally, such signals are just discarded, to avoid having spurious data propagate to higher layers. Also, frames that are correctly detected and received by the access point are also discarded if they are not addressed to the access point.

Instead of discarding information about such traffic, the radio module 210 of the access point records the information for use by the CCC. In addition to passively listening and gathering information, the radio module might assist with active testing, such as by sending out frames to be detected by other access points or network monitors.

One of the difficulties that has been encountered in implementing wireless networks, such as IEEE 802.11 wireless networks, is the difficulty of mapping or surveying the network. Mapping helps in determining weak areas, vulnerable access points, overused areas, etc. Physical monitoring, such as by a technician moving through the wireless network space, is time-consuming and might interfere with normal operation of the network.

Figure 6:
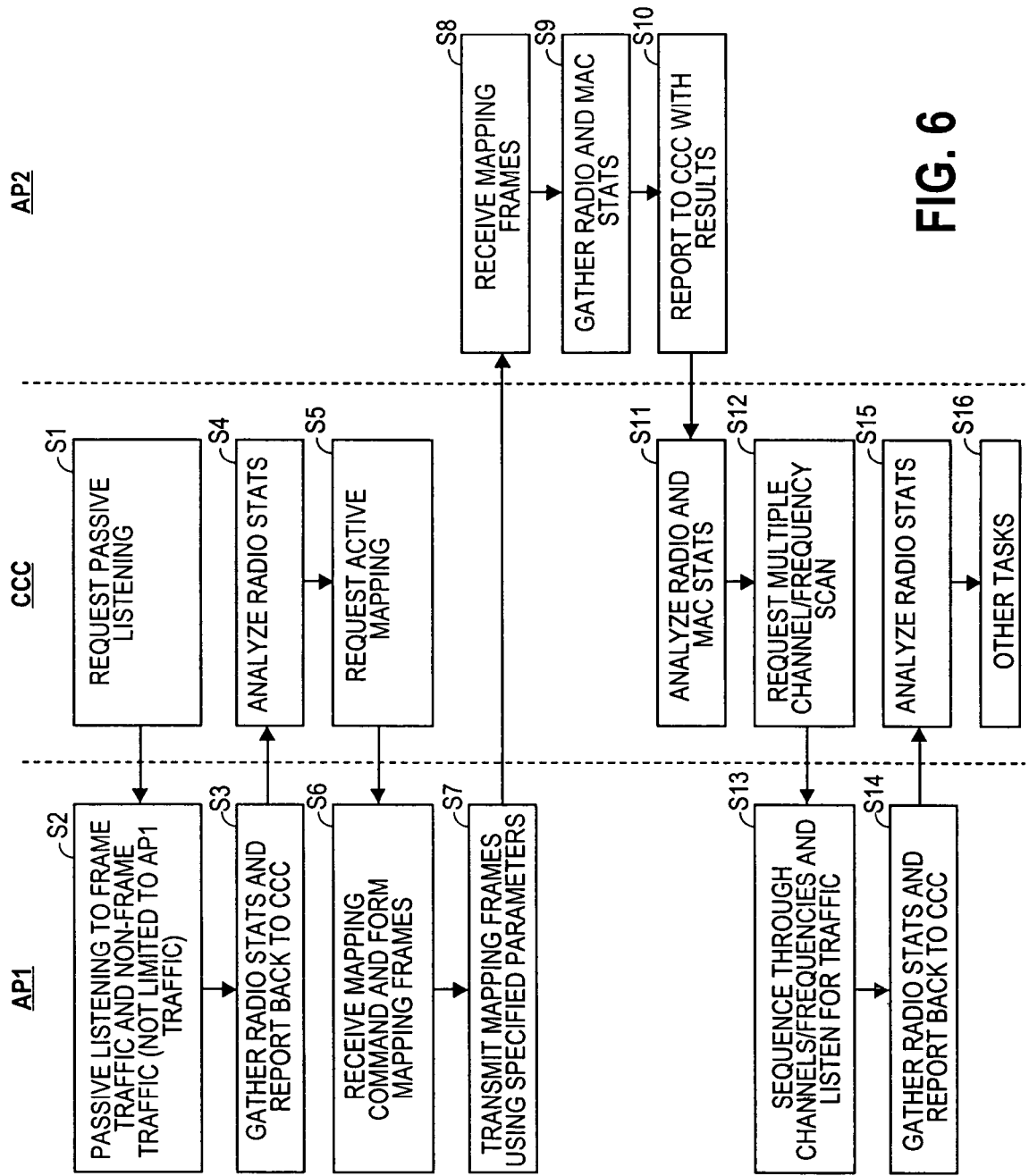
FIG. 6 is a swim diagram illustrating interactions between two access points and the CCC for radio monitoring and mapping.

FIG. 6 illustrates one possible sequence for mapping a wireless network. In a sequence, the CCC performs a passive listening process, then an active mapping process, and then a scan process. These processes can be done in that different orders or be done separately. As illustrated, in step S1, the CCC directs the access point to begin the passive listening process. The access point begins the process (S2) listening for frame traffic and non-frame traffic and populates its radio stats table (see FIG. 4(B)) accordingly. For each is source of radio signal, the access point might be able to identify it as a station or as a non-station source of interference. For stations, the access point should be able to identify an SSID for the radio, whether it is an access point, if it is a client, whether it is associated with the access point, and various other measurement parameters. These radio stats are gathered and reported back to the CCC (S3), which then can analyze them (S4) to determine the nature of a radio sources in the wireless network.

When requesting active mapping (S5), the CCC would issue a particular mapping command or set of mapping commands to the access point, which would then receive the command or commands (S6) and form suitable mapping frames to be transmitted (S7) over the wireless network in support of those commands. Some of the mapping frames can be expected to be received by other access points. Those other access points, specifically the radio modules of those access points, would then receive the mapping frames (S8), gather radio and MAC stats for those frames (S9), and report the results back to the CCC (S10). The CCC could then analyze the radio and MAC stats (S11).

For a scan process, the CCC sends a request for a scan over multiple channels, multiple frequency bands, or combination thereof, to the access point (S12). The access point then receives a request (S13) and sequences through the channels and/or frequencies and listens for traffic and/or sends out mapping frames, gather radio stats to be reported back to the CCC (S14), which then can analyze the stats (S15) and perform other tasks (S16).

In this manner, a survey can be done of the wireless network. One interesting result of a survey is that the CCC can detect "rogue" access points that are using the wireless network but are unknown to the CCC. Rogue access points can be the result of an unauthorized user adding the access point to a network, interference from neighboring wireless networks, or authorized access points not yet configured or registered.

Preferably, radio monitoring does not interfere with normal network operations. For example, it would be unwise for an access point that is serving four or five active users to drop them and instead perform a scan of various other radio channels. In a passive scan, an access point "listens" to all passing frames and reports their statistical information (e.g., channel, time, date, transmission achieved yes/no, signal quality and signal strength, latency, sent to, sent from and throughput) back to the CCC where such statistical information can be stored for later processing and reference.

Each access point can, under the control of the CCC, periodically scan across an entire frequency range, listening not just to frames directed at it, but any passing frames and additionally transmit beacons across each channel. Any frames that are "seen" (and any responses to the beaconing) can then be reported back to the CCC for further analysis. This process can be synchronized by the CCC such that access points are not serving any users when they begin a frequency hopping process and to ensure that beacons are not sent out on channels that other nearby access points are using to communicate with network users. Each transmission of a mapping data frame and a real data frame to an end user can be monitored on the same set of terms.

One use for the frequency stepping results is to test and log the radio quality delivered to actual end users and also to present it to a system administrator, so that he or she may derive actionable conclusions. For example, if the system administrator determines that bad coverage is located at the conference room on the second floor of a particular building, the system administrator can advise placing another access point at that location.

Each access point under the control of the CCC can periodically send test frames to other nearby in-network access points at specified times and frequency channels. Note that "nearby" access points can be determined on the basis of proximity tables maintained by the CCC. Such proximity tables can be generated as a result of the radio monitoring process described above. Some access points can be designated as "listen-only devices" that passively listen to all passing frames and scanning across channels as directed by the CCC, without supporting any client connections.

The combined results of the exercises can result in a richly detailed, real-time map of the radio environment surrounding and associated the wireless network. One of the results of these exercises, as indicated previously, is the creation of a proximity table, which comprises a radio-only logical map of the network. Using the proximity table, the CCC can produce an approximate physical map of the wireless network. Additionally, a radio service quality log can be created, which illustrates the delivered radio transmission quality for all users of the wireless network.

Figure 7:
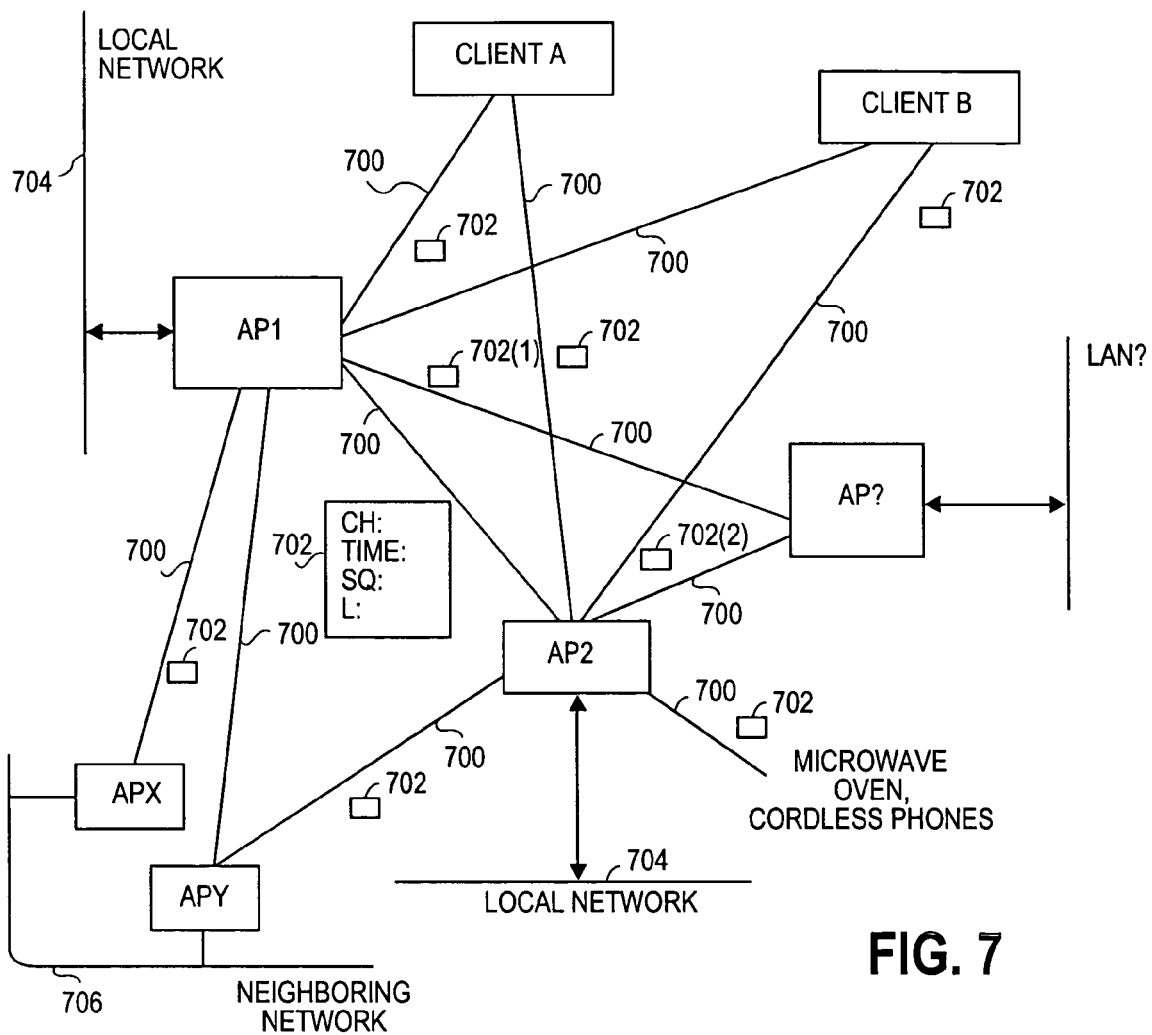
FIG. 7 is a graphical representation of the results of a radio map, wherein several access points determine statistics of signals from objects in the wireless network space.
Figure 8:
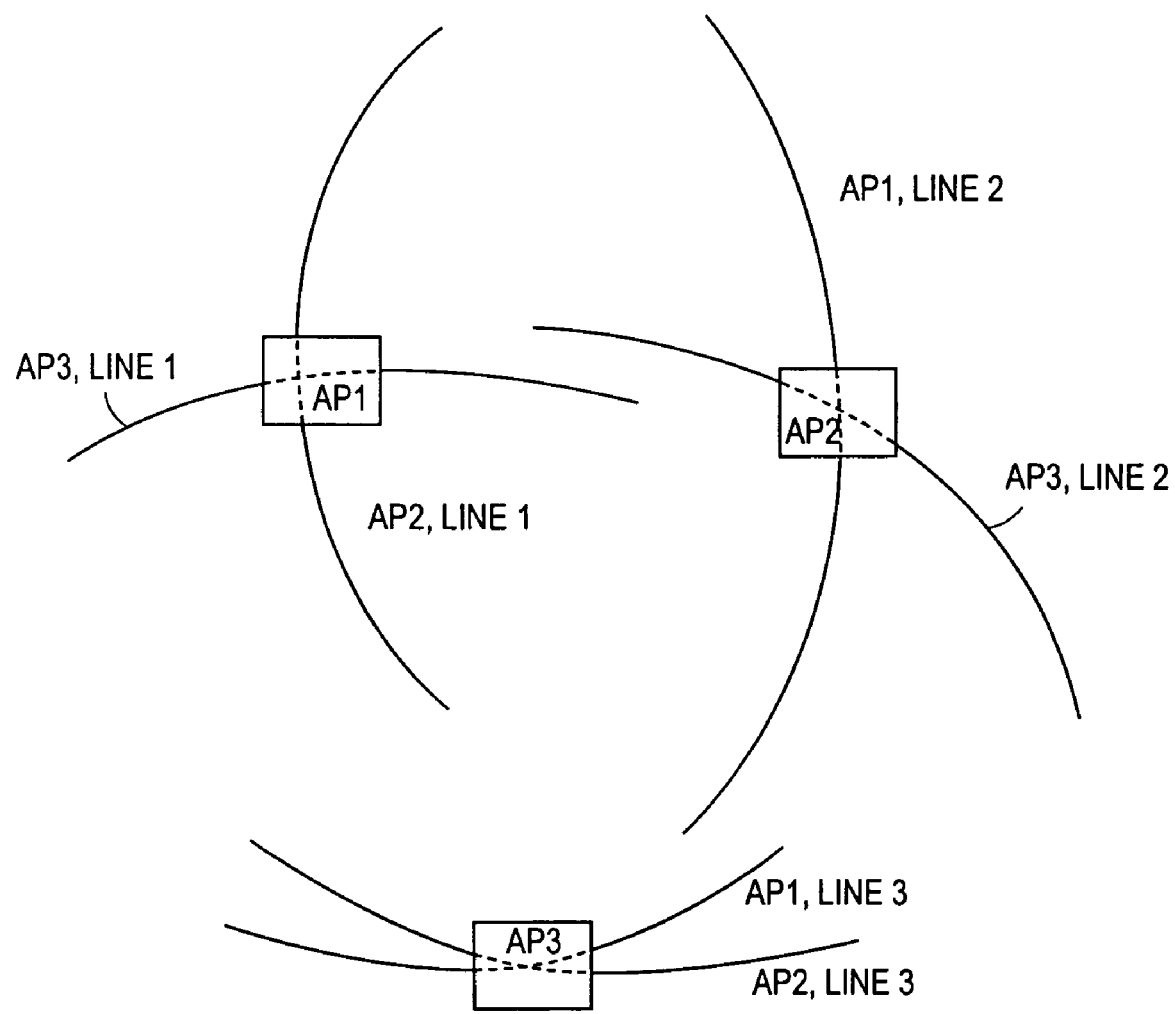
FIG. 8 illustrates how radio map statistics could be used to at least approximately locate an access point at a physical location.

FIG. 7 is a logical representation of such a radio map. As shown there, the wireless space includes two access points, AP1 and AP2, that are known to be connected to a LAN 704, two clients (A, B), two access points, APx and APy, known to be connected to an unrelated neighboring network 706 and an access point, AP?, of unknown origin. In one representation, the radio map has links 700 and stats 702 for each link, where a link represents traffic from one source to one monitoring access point. Note that some of the sources might be other than network devices. Examples of stats for a link might be as shown in FIG. 4(B). As illustrated, AP1 has detected the presence of client A, client B, access point AP2, access point AP?, and access points APx and APy, while AP2 has detected the presence of client A, client B, access point AP1, access point AP?, access point APy, and non-network interference sources. For each of these presences, the respective access point can record statistics and forward them to the CCC.

With a collection of data for radio sources, the CCC might be able to determine an approximate mapping. For example, consider FIG. 8. Assume that distance between two radio sources is determinable from signal strength. That is often not the case for wireless networks, with differing transmit powers, multipath interference, signal delays, and the like, but it is illustrative nonetheless. With information from AP1, the CCC can determine the distance from AP1 to AP3 and the distance from AP1 to AP2, and can do likewise for the other two access points. From those distances (and the absolute location of at least one source in the wireless network), the CCC might be able to determine the location of each of the other access points. Of course, given the typical environment expected of a wireless network, the signals will not be perfect, but with many access points providing additional data points, the location of each access point could be determined at least approximately enough to allow a technician to quickly locate and/or isolate any given radio. With such information, for example, a network administrator can quickly zero in on a rogue access point.

Other conclusions can be derived from the radio map. For example, areas of poor coverage may be detected, which in turn permits the CCC to recommend the placement of additional access points based on data compiled the real-time map. Such a map also permits the detection (i.e., area/time/date/frequency channels) of known radio sources of radio disturbances (e.g., 12:00, weekdays, all channels, around the second floor, cafeteria, etc.) and the generation of corresponding alerts. Any neighboring networks can also be detected based on data contained with the generated real-time map. In addition, the transmission channels, locations and time patterns of such neighboring networks can also be identified and detected so that any associated interferences can be bypassed.

A radio map can also be used to detect any suspicious conversations, such as a conversation among known users (e.g., identified through a MAC address) and an unknown access point. By detecting such conversations, it can be determined that a network user may have inadvertently strayed into another network, which in turn results in the generation of a corresponding alert. Such a radio mapping can further be used to promote load balancing between access points by causing an overloaded access point to disassociate one or more associated users, provided that such users can be "seen" or identified and therefore picked up by another nearby access point. The CCC can determine from the radio map that a given user can be seen by more than one access point either by noting that more than one access point is picking up transmissions from that user and can decode frames accurately. Alternatively, but probably not as reliably, the CCC can determine that the user can get service from another access point by just estimating coverage from the calculated physical positions of each radio and stats about nearby interference.

Radio maps can also be used to promote dynamic detection and throttling back of excessive spectrum-consuming use by specific users. For example, an individual located near an access point may back up a hard drive and consume all available bandwidth, leaving other users unattended. Additionally, a radio mapping as described herein can result in the dynamic production of radio frequency assignment commands by the CCC to each access point in order to maximize the spatial density achieved in the network by avoiding interference caused by other networks and by the network interfering with itself (i.e., through the use of non-overlapping channels in order to encourage spectrum re-use).

Suspected rogue access points may comprise actual rogue access points, access points not yet configured, or access points from a neighboring wireless network. The CCC might include processes to determine which type of access point it actually comprises.

In one example of such a process, the CCC might detect an unexpected access point and cause another device to simulate a client or a "wireless DS" access point and direct traffic at that access point to set up a link. Once a link is set up, the CCC can initiate a ping or a traceroute operation where packets travel through the unexpected access point back to a site controlled by the CCC. Using the results of that test, the CCC might be able to determine where the networks to which the access point is connected.

Since the access point collects more information than a conventional access point, the CCC can do more that if conventional access points are used. In some cases, an access point might be dedicated to the radio stats collection process such that it does not carry client traffic, just monitors radio traffic and/or actively probes the wireless network. In some cases, an access point will monitor just frames addressed to that access point, while in others the access point just or also monitors frames that are addressed to other network devices. In some cases, the access point just records information that a conventional access point would record, but in other cases, the access point records more data than is normally needed to act as an access point or saves data that is developed in the PHY or MAC layer but is discarded in normal course of supporting conventional 802.11 traffic. For example, radio signal strength might be data used in the PHY layer and discarded once valid frames are received, but that data can be saved and passed on to the CCC for analysis of the wireless network. An access point might include other functions involving sniffing the wireless network to which it has access.

Radio stats can be combined with SNMP an authentication data to get a fuller network state. This data can be used to deal with rogue access points or to adjust the network in other ways. For example, if the CCC finds that an unauthorized access point is operating in its wireless space, the CCC can alert an operator and narrow down a physical search for the unauthorized access point. The CCC might also do the same for unauthorized clients, gateways, etc. The CCC might also act directly to disable the rogue access point if it is on a wired network or distribution system controlled by the CCC.

In addition to dealing with rogue network devices, the CCC might also handle network reconfigurations. For example, based on radio stats, the CCC might determine that an access point is overloaded and make selective requests to that overloaded access point to deassociate one or more network devices. Preferably, the network devices that are to be disassociated are within range of other access points, a condition that the CCC can determine from the collection of radio stats from other access points. The CCC might be used to monitor other, more complex statistics, such as a comparison of airtime usage versus throughput.

FIG. 9 illustrates several tables that might be used by the CCC to support a user radio and a link management process. FIG. 9(A) is a table of active clients indicating, for each active client, the user MAC address, actual physical location (as that might be estimated during a radio survey), expected physical location (as might be determined during a physical installation process), a list of active services for that client, and other parameters about the client. FIG. 9(B) is a table of historical network activity usable for diagnostics and support.

Figure 10:
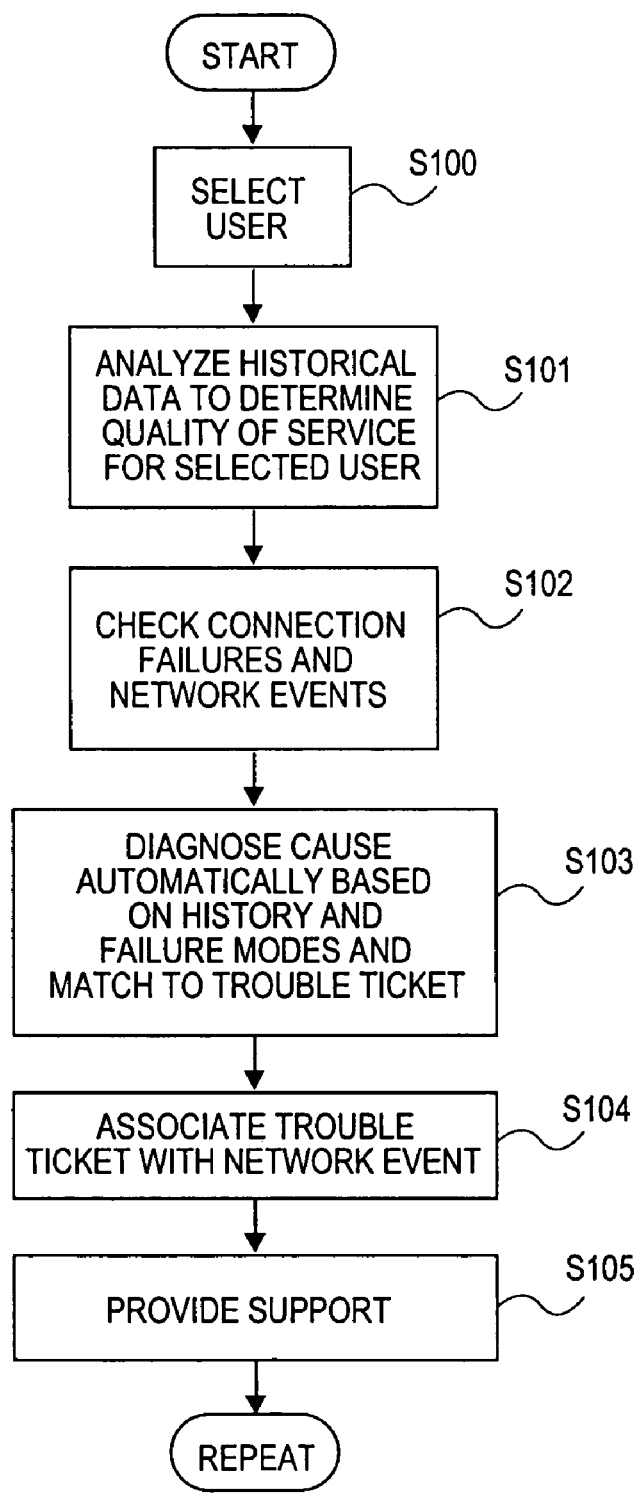
FIG. 10 is a flowchart of a process for diagnosing user problems based on network history.

FIG. 10 is a flowchart of a process that a CCC might use to support such functions. In this example, is assumed that the process of FIG. 10 is performed by a support person, but it should be understood that some of these processes might be fully automated without human intervention. As illustrated there, the administrator selects a user (S100) from a list of supported users and then analyzes, and/or causes a computer to analyze, historical data to determine quality of service for the selected user (S101). The administrator or the CCC can then check connection failures and network events (S102) and diagnose causes of errors automatically, based on history and failure modes (S103). The causes, history and failure modes can be matched to trouble tickets (S104) such that support can be provided (S105).

Historical traffic data can be maintained on the basis of a specific user rather than a device itself. For example, such historical traffic data can provide an indication of the quality of service experience by a particular user regardless of what type of mobile device (e.g., laptop/NIC, etc.) that user is currently using and aggregate that user's experience over different network devices. Historical network traffic data can be used to ensure (rather than merely monitor) the quality experienced by a specific network user, possibly across multiple network devices.

As template uses used for the historical network traffic data, the CCC might be alerted to a sequence of failed connection attempts at a particular MAC address. With a failed connection attempt, the CCC might not be able to determine the user making the attempt, as the connection might not have gotten to a stage where user identification is exchanged. Nonetheless, the CCC could use the historical network traffic data to identify the user or most likely using the problematic MAC address and proactively provide support to that user, such as by identifying the user from a company telephone directory or e-mail directory and contacting user to discuss connection problems.

In a trouble-ticket based support system, specific user trouble-tickets might be associated with specific network events. In essence, specific user trouble-tickets can be tied with specific events at the network level, such as for example, transmission types and rates, association/disassociation events, and so forth.

Using these techniques, 802.1x link layer authentication can be combined with network management thereof in order to associate both and provide a variety of useful services on this basis. Some such services may include the ability for a system administrator to select a user and immediately see their current MAC address, their physical location, what service they are receiving, etc. Such services can also include maintaining a history of wireless network traffic data by user (not just by network address, but by user as they access the network using differing devices). Additionally, such services can permit the use of such information to ensure (rather than simply monitor) the quality experienced by person a particular network user, regardless of the device/MAC address they are using. In addition, such services can include the ability to track down multiple failed connection attempts by a certain MAC address and deduce the user who is failing to connect (e.g., the user may have lost a password) based on historical connection data and proactively call/email the user(s) with support. Finally, such services may include a tying of association of specific user trouble-tickets with specific events at the network level, such as for example, transmission types and rates, association/disassociation events and so forth.

Figure 11:
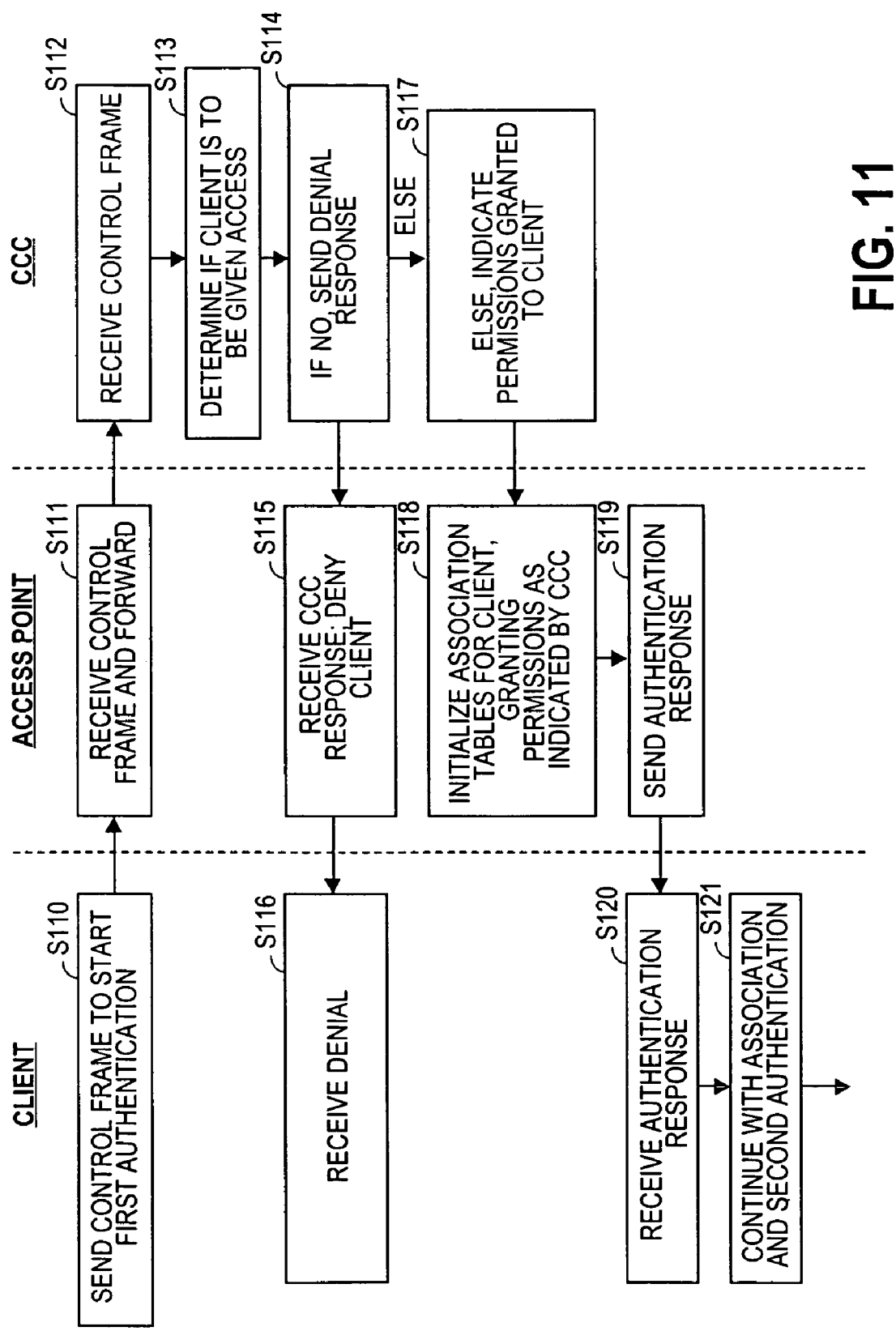
FIG. 11 is a swim diagram illustrating interactions between a client, an access point and a CCC, where access is controlled centrally by the CCC.

FIG. 11 is a swim diagram illustrating another use of the CCC, to provide centralized access control. The process begins with a client sending a MAC management frame (S110) to an access point. Previous access points might have processed the request locally, which in turn is sent out across an associated wired network to an authentication authority (e.g., a domain server or a directory) and base its decision on data returned by the authentication authority. With the present approach, the access point transfers of the decision-making process to the CCC forwarding the control frame (S111) to the CCC. The CCC receives a control frame (S112) and determines if the clients is to be given access (S113). If the client is not to be given access, the CCC responds (S114) to the access point to deny the client (S115) and the client receives a denial (S116). In some instances, clients are not informed of the denial and only hear from the access point when access is granted.

Where the CCC decides to grant access, it indicates to the access point that access is granted and provides indication of the permissions granted to the client (S117). The access point then initializes is a local tables for granting permissions as indicated by the CCC (S118) and sends an authentication response to the client (S119). Once the client receives the authentication response (S120) and continues with association and second authentication and other processes (S121).

As described above, the access points pass key management and control functions of 802.1x access points to a central controller (the CCC). This allows other functionality, such as the routing of visiting users away, from private networks and tunneling between the client and the CCC through the access point. Communications between the CCC and the access point can be carried out through a secured tunnel (s-tunnel) connection. It can be appreciated that the access points can carry out a "firewall" function by passing any control frames (for 802.11, MMPDUs are examples of control frames) received from clients back to a dominating CCC that can control the access points in detail and assume the role of an authenticator in which a received request to access a wireless network is transferred from one of the access points to the CCC, which in turn generates a response or command which is returned to the appropriate access point either granting or denying association privileges based on the response received from the CCC. With centralized control, subnet roaming and guest services can be easily accommodated.

Figure 12:
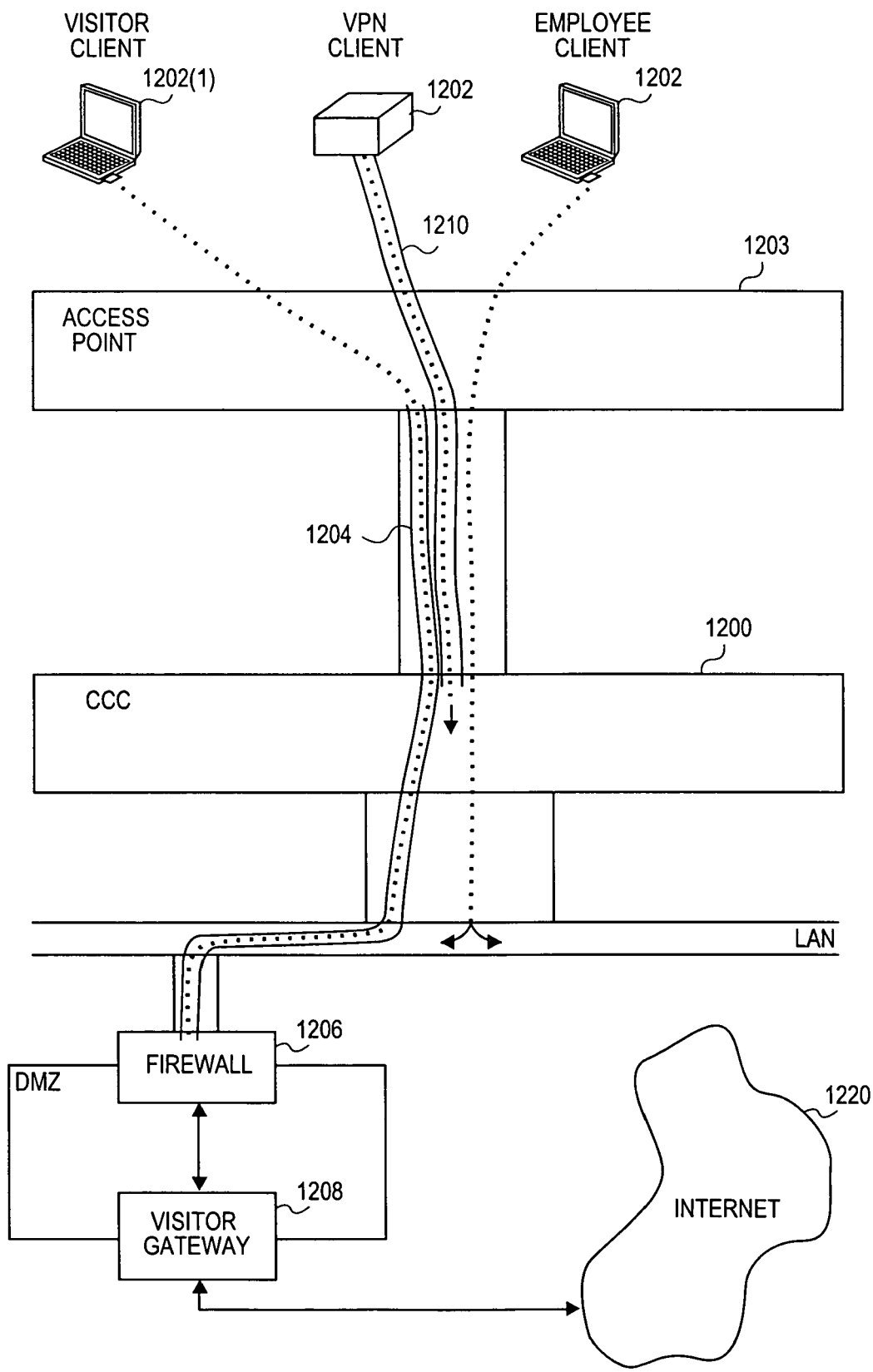
FIG. 12 illustrates tunnelling used in a wireless network.

FIG. 12 illustrates how tunneling might be used to provide controlled connections between a client and a CCC via an access point and between an access point and a firewall via the CCC and a LAN. The latter is useful with users that are not authorized to use the LAN in that they can still get access to other networks that might be beyond the LAN.

As illustrated in FIG. 12, a variety of clients 1202 connect to services supported by a CCC 1200 via an access point 1203. A visitor gateway is implemented using a tunnel 1204 and client-to-CCC tunneling is implemented using a tunnel 1210. Other tunnels might be implemented as well. Tunnel 1204 packages up traffic between visitor clients, such as client 1202(1), and transports it to a firewall 1206, which connects to a visitor gateway machine 1208 at a "demilitarized zone" or "DMZ", to allow for a visitor client to access the Internet 1220, but not send or receive traffic to or from the LAN. Traffic from authorized clients can travel onto the LAN. The status of a particular client can be determined at the CCC using data maintained there. Since the CCC performs the access control functions, it does not necessarily need to rely on the access points to determine which clients should be tunnelled and which clients should be allowed onto the LAN.

In FIG. 12, the visitor client and the employee client are shown as distinct network devices. In some cases, one network device might be used to both by authorized employees and visitors, in which case the MAC address of the network device would be insufficient to identify the level of access to be granted. Thus, a mobile employee can communicate with an access point of a wireless network and a visitor may attempt to communicate with the access point using the same network device. Since the CCC controls access, it can distinguish between the users that The CCC also can automatically route a visitor to visitor gateway 1208 when the visiting user attempts to contact access point 1203. Additionally, the CCC can communicate with the access point through a secure communications tunnel (e.g., S-tunnel).

Multiple Independent Networks

Occasionally there is a need to have more than one independent network operating in an overlapping wireless space. This can be done by having parallel sets of access points, but from a hardware perspective, this is inefficient. According to embodiments of wireless networks according to the present invention, multiple independent networks are supported through a set of access points use the existing 802.11 encryption protocols. 802.11 devices can send frames indicated as unicast frames, multicast frames, or broadcast frames. Unicast frames are characterized as having a single network device as its destination. Broadcast frames are characterized as being directed to all network devices that are capable of receiving the frames. Multicast frames are in between unicast frames and broadcast frames in that that multicast frames are characterized as having a destination that is a group with which network devices can be associated. Multicasting requires more infrastructure then the unicasting or broadcasting, as group associations need to be maintained.

Where multiple independent overlapping wireless networks exist, it is preferable to have technique for broadcasting just among one of the overlapping networks and to do so with the minimum amount of set up. Using a wireless network configured according to aspects of the present invention, this is done using the encryption behaviors of the typical wireless network. In a typical wireless network, network device receives frames and determines whether the frames are encrypted. If the frames are encrypted, the network device attempts to decrypt the frames using the encryption keys available to the network device. If the network device it cannot decrypt and encrypted frame, the network device drops the frame. In a typical instance, the network device will silently drop the frame (i.e., not request retransmission or otherwise indicate failure of receipt).

For unicast traffic, the access point could maintain a MAC address of each client in a table indicating which MAC addresses go with which distribution systems (Doss). However, for broadcast traffic, is more difficult for one access point to manage multiple sets of traffic among the stations associated with the access point. When an access point transmits a broadcast frame, all associated clients will receive and process that broadcast frame, which is undesirable when attempting to a broadcast a frame to just a subset of clients associated with less than all of the distribution systems served by the access point. The access point typically transmits broadcast frames and a unicast frames using a BSSID (typically, the MAC address of the access point's radio) that the client understands is the BSSID for the access point with which the client is associated.

To solve this problem, the network is configured to use 802.1x encryption processes to in effect "separate out" broadcast traffic for multiple networks. Thus, the clients that are part of a first network will have a first encryption key used for broadcast frames (and possibly some unicast frames) and clients that are part of a second network will have a second encryption key used for broadcast frames and other frames. When a particular client receives a broadcast frame, the client attempts to decrypt the frame and if the decryption fails, the client will assume the packet was not directed at it and will ignore the packet. As a result, clients that are in a first network will drop frames that are broadcast frames encrypted using a second network's encryption key and clients that are in a second network will drop frames that are broadcast frames encrypted using the first network's encryption key, effectively creating more than one broadcast zone in a given area.

In this manner, different clients can be associated with different networks through a common access point. In addition to multiple broadcast encryption keys, not each client might also maintain unicast encryption keys. Each client will then drop all packets from that access point, except for unencrypted packets, packets encrypted with the client's unicast encryption key, and packets encrypted with the broadcast encryption key for the network with which the client is associated.

The standard sequence for MAC management when a client connects to an AP is 1) a first authentication wherein control frames (MMPDUs in the case of 802.11 networks) are sent; in a typical network, an access point accepts all clients in this step, 2) association wherein a link is established between the client and the access point, and 3) 802.1x authentication (not required for all links).

Following those three steps, the access point would know the MAC address of the client. The 802.1x authentication exchange goes through the access point to an authentication server (which might be a RADIUS server). At the end of the exchange, the authentication server sends a message back to the client through the access point and can include some optional attributes in a message. One of the possible, optional attributes is a VLAN attribute indicating that the user client should be connected and its data traffic allowed on to a particular VLAN. Another set of attributes is a set of keys including one or more unicast keys and one or more broadcast keys.

Figure 13:
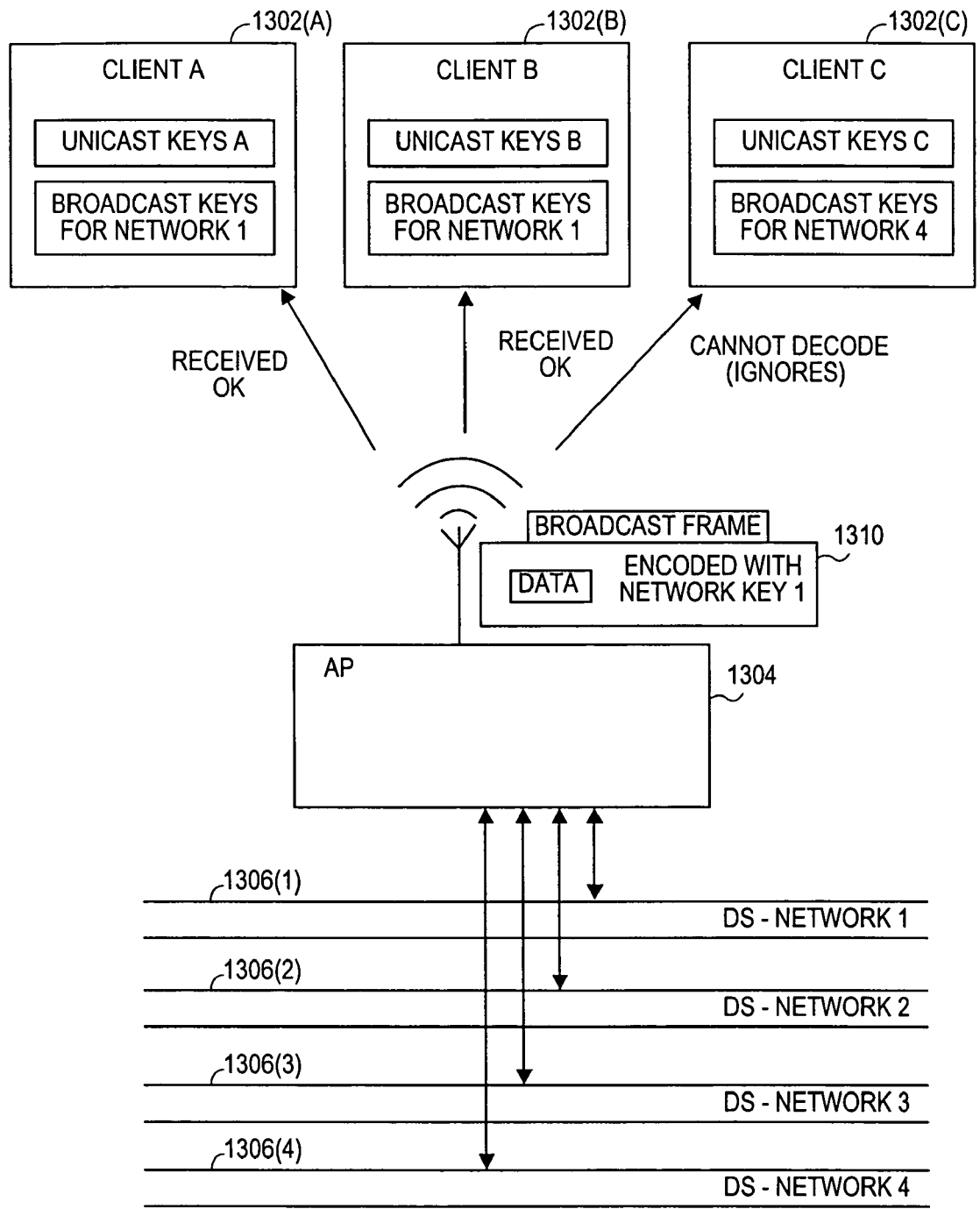
FIG. 13 illustrates broadcasting to subnetworks of a wireless network using encryption.

FIG. 13 illustrates an access point 1304 might support multiple independent networks for our clients 1302. As illustrated there, access point 1304 supports four independent networks 1306. As illustrated, clients A and B are part of network 1 and client C is part of network 4. When an access point 1304 sends a broadcast frame 1310 encoded with a broadcast key for network 1, each client receives broadcast frame 1310 and decodes it because it is apparently addressed to each of those clients being a broadcast frame. However, clients A and B correctly the code frame 1310 but client C, not having a matching decryption key, fails to the code frame 1310 and discards it. Of course, when access point 1304 is to send a broadcast message to all clients in the network 4, it would use the broadcast keys for network 4 and that message would be dropped by all clients except those in the network 4.

While the above example is explained with an illustration of multiple distribution systems (DS's), there might be some configurations where the traffic is carried on a single distribution system.

Stations that expect to receive encrypted traffic are generally set to reject unencrypted traffic, so it is thus possible to partition the access point into two independent networks. For example, a network device on a first independent network might be configured to ignore unencrypted traffic and receive broadcast messages encrypted with broadcast keys for the first independent network, while a network device on a second independent network might be configured without any broadcast keys and thus would only except the unencrypted traffic and discard the encrypted broadcast frames.

Novel access points, wireless network controllers, enhanced methods of wireless network control and the like have now been described. Some implementations might be in the form of novel access points, while others are in the form of additional functionality added to existing access points. For example, an access point that is implemented as a chipset and/or programmable devices might simply include added software to handle one or more of the novel functions described herein. Modifications might be made to clients, but the present invention can operate with conventional clients as well.

The embodiments and examples set forth herein are presented to best explain the present invention and its practical application and to thereby enable those skilled in the art to make and use the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system in which user management and radio management functionalities associated with a wireless network are integrated to provide wireless network services thereof, comprising:

a link layer authentication module adapted to link a plurality of wireless network layers to one another; and a network management module integrated with the link layer authentication module, such that the network management module and the link layer authentication module together form an integrated user and radio management module which provides wireless network services for the wireless network, wherein the integrated user and radio management module is adapted to permit a determination of a plurality of failed wireless network connection attempts based on a user address to thereby deduce a user associated with the user address.

2. The system of claim 1, wherein the integrated user and radio management module is adapted to permit a wireless network administrator to select a user of the wireless network to thereby view and manage user data associated with the user.

3. The system of claim 2, wherein the integrated user and radio management module is adapted to permit a wireless network administrator to select a user of the wireless network to thereby view and manage user data associated with the user, wherein the user data comprises at least one of the following:

a current MAC address associated with the user;

a physical location of the user; and at least one wireless network service received by the user.

4. The system of claim 1, wherein the integrated user and radio management module is adapted to permit a history of wireless network traffic data to be compiled on the basis of user data associated with a user of the wireless network.

5. The system of claim 4, wherein the history of wireless network data is adapted for use in quality control of wireless network services associated with the user.

6. The system of claim 1, wherein the determination of the plurality of failed wireless network connection attempts is further based on historical wireless network connection data associated with the user.

7. The system of claim 1, wherein the user address comprises a MAC address.

8. The system of claim 1, wherein the integrated user and radio management module is adapted to permit at least one wireless network function to be associated with at least one wireless network event for network troubleshooting thereof.

9. The system of claim 1, wherein the wireless network comprises an IEEE 802.1x wireless network.

* * * * *